United States Patent [19]

Ikumi

[11] Patent Number: 4,556,150
[45] Date of Patent: Dec. 3, 1985

[54] SPLIT-TYPE PLASTIC COVER WITH ELASTIC CLIPS

[75] Inventor: Yasumasa Ikumi, Toyota, Japan

[73] Assignee: Toyota Jidosha Kogyo Kabushiki Kaisha, Toyota, Japan

[21] Appl. No.: 610,183

[22] Filed: May 14, 1984

Related U.S. Application Data

[63] Continuation of Ser. No. 341,855, Jan. 22, 1982, abandoned.

[30] Foreign Application Priority Data

Oct. 22, 1981 [JP] Japan .................. 56-167916

[51] Int. Cl.⁴ .............................. B65D 45/18
[52] U.S. Cl. ................... 220/4 B; 220/326; 292/258
[58] Field of Search ............ 292/256.63, 258, 256, 292/343; 220/4 E, 4 B, 326; 215/287, 290

[56] References Cited

U.S. PATENT DOCUMENTS

| | | | |
|---|---|---|---|
| 668,691 | 2/1901 | Rudd | 220/326 X |
| 711,028 | 10/1902 | Webb | 215/282 |
| 772,038 | 10/1904 | Hess | 215/290 |
| 1,244,496 | 10/1917 | Hammer | 215/287 X |
| 1,331,470 | 2/1920 | Luckett | 215/287 |
| 1,921,015 | 8/1933 | Young | 220/4 E X |
| 3,101,154 | 8/1963 | Herdering | 220/326 X |
| 3,244,311 | 4/1966 | Lawson | 220/4 B |
| 3,940,008 | 2/1976 | Flanders | 220/5 R |
| 4,133,442 | 1/1979 | Wiltshire | 220/5 R |
| 4,267,940 | 5/1981 | Wade | 220/5 A X |

FOREIGN PATENT DOCUMENTS

| | | | |
|---|---|---|---|
| 778213 | 2/1968 | Canada | 220/324 |
| 771829 | 10/1934 | France | 220/324 |
| 2411777 | 7/1979 | France | 220/324 |
| 141000 | 7/1930 | Switzerland | 220/324 |
| 601319 | 5/1948 | United Kingdom | 215/290 |

Primary Examiner—Allan N. Shoap
Attorney, Agent, or Firm—Kenyon & Kenyon

[57] ABSTRACT

A plastic cover comprising a pair of matable convex cover halves each having flanged projections, and fixtures which hold the corresponding opposite flanged projections of the two cover halves when the two cover halves are connected to each other, said fixtures each comprising an elastic clip of a leaf spring having bent free ends which hold the flanged projections therebetween and a center recess located between the free ends for enabling the free ends to be easily and elastically deformed when the clips are attached to the corresponding flanged projections.

7 Claims, 5 Drawing Figures

SPLIT-TYPE PLASTIC COVER WITH ELASTIC CLIPS

This application is a continuation of application Ser. No. 341,855 filed Jan. 22, 1982, abandoned.

This invention relates to a split-type plastic cover and, particularly, to a connecting arrangement thereof.

Split-type plastic covers having two separate cover halves conventionally have been used, for example, as timing belt covers for automobile engines. The two cover halves have been connected to each other by bolts and nuts. However, the plastic material of which the covers are made has made it necessary to provide stiffening or doubling plates between the nuts or bolts and the cover. That is, the plastic material is generally not strong enough for direct attachment of bolt or nut.

Furthermore, it has been necessary to provide spaces in the directions of extension of the length of the bolts for bolt engagement or disengagement from the cover. Particularly in case of timing belt covers in automobile engines, however, there is not usually sufficient space around the cover, the insufficient space thereby making it very difficult to connect the cover halves together.

The primary object of the present invention is, therefore, to provide a split-type plastic cover having two cover halves which can be simply and easily connected together by means of elastic clips, in place of bolts and nuts.

The invention will become more apparent from the detailed description of the preferred embodiment presented below, wherein reference is made to the accompanying drawings, in which.

Figure 1A:
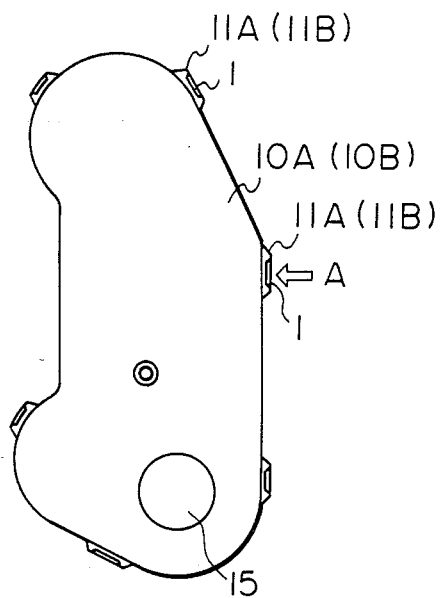
FIGS. 1A and 1B are plan and side views respectively of a plastic cover with clips, according to the present invention.
Figure 1B:
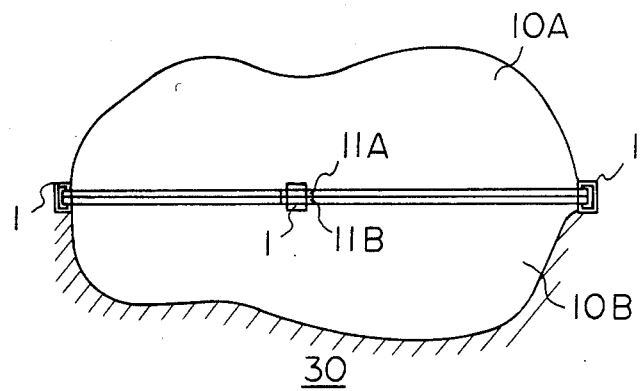

FIGS. 1A and 1B show an example of a plastic cover of this invention. It should be noted that the invention is not directed to a shape or profile of a plastic cover, and, accordingly, the shape of the cover is not limited to the illustrated embodiment. It should also be noted that the present invention is not limited to a timing belt cover for an automobile engine, illustrated in FIGS. 1A and 1B.

The plastic cover has two convex cover halves 10A and 10B having identical profiles at their connecting or mating faces, so that the two halves can be put together along their peripheries. In case of a timing belt cover, the upper cover half 10A is located above the lower cover half 10B, which is secured, for example, to a cylinder head 30 (FIG. 1B). The numeral 15 designates a hole through which a crankshaft (not shown) of an automobile engine (not shown) extends, and has no direct relationship to the present invention.

The cover halves 10A, 10B are provided, on their peripheries, with flanged projections 11A and 11B, which are spaced from one another. The flanged projections 11A and 11B are arranged in a mirror image so that when two cover halves are put together, the positions of projections 11A match those of projections 11B. A seal member, such as a gasket 20, can be provided between the two cover halves along the entire peripheries of the cover halves, if necessary. In case of a timing belt cover, the provision of the gasket 20 is advantageous since entrance of a foreign substance, such as a dust, into the cover is not desirable. The gasket 20 can be attached to a peripheral projection 17 provided on the peripheral edge of one of the cover halves 10A and 10B, for example the cover half 10A, so that the projection 17 is surrounded by the gasket 20, thereby preventing the gasket 20 from detaching from the cover half 10A. One of the cover halves, for example cover half 10A, is provided with a peripheral abutment 13 which extends parallel to the projection 17 and which comes into contact with the flanged projection 11B of cover half 10B to define a uniform space D between said cover halves. That is, the abutment 13 serves as a spacer which defines the amount of the gasket 20 to be crimped when the cover halves 10A and 10B are forced in contact and connected with each other. The gasket 20 is placed in the space D between the cover halves 10A and 10B to prevent entry of a foreign substance, such as dust, into the assembled plastic cover.

Figure 2:
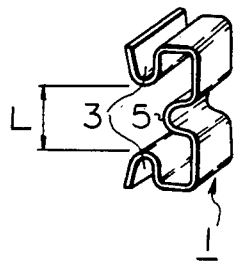
FIG. 2 is a perspective view of a clip according to the present invention.

According to the present invention, the two cover halves 10A and 10B can be connected to each other by means an elastic clip 1 which consists of a generally C-shaped leaf spring with its ends and center symmetrically bent to form generally U-shapes, as shown in FIG. 2. That is, the clip 1 has a center recess 5 of a generally U-shaped cross section, and free ends 3 bent to form generally U-shapes. The clip 1 is symmetrical with respect to the center recess 5. The free ends 3 are bent so that when the clip 1 is attached to the flanged projections 11A and 11B, the free ends 3 of the clip 1 will press the flanged projections 11A and 11B toward each other, due to the elasticity, thereby clamping the flanged projections 11A and 11B between them. The center recess 5 makes it possible on the one hand to easily pull apart the free ends 3, without breaking the clip 1, to fit the clip 1 on the flanged projections 11A and 11B and on the other hand to have the thus elastically deformed clip substantially return to its original shape after the clip 1 is fitted on the flanged projections 11A and 11B. In order to elastically hold the flanged projections 11A and 11B between the free ends 3 of the clip 1, the distance L (FIG. 2) between the free ends 3 of the clip 1 in its free state is slightly smaller than the distance S (FIG. 4) of the outer faces of the flanged projections 11A and 11B ($L<S$). The fastening force exerted on the flanged projections 11A and 11B by the clip 1 depends on the elasticity of the leaf spring of the clip 1 and on the difference between L and S (L-S).

Figure 4:
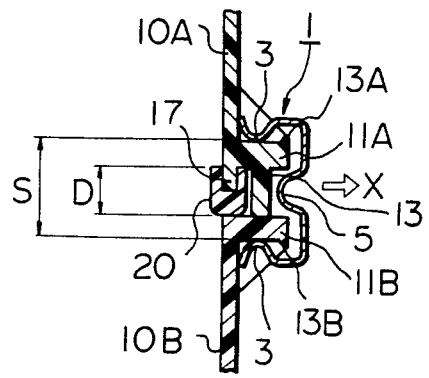

Preferably, the outer edges of the flanged projections 11A and 11B are provided with small projections 13A and 13B to prevent the clip 1 coming off from the flanged projections 11A and 11B, in the direction designated by the arrow X (FIG. 4). To detach the clip 1 from the flanged projections 11A and 11B, it is necessary to pull the clip 1 in the direction X, with a force strong enough to ensure the free ends 3 ride over the small projections 13A and 13B.

Figure 3:
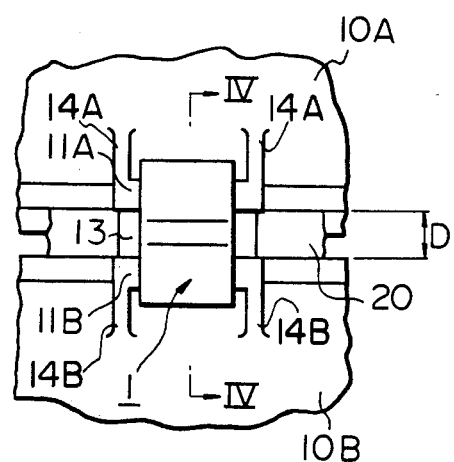
FIG. 3 is an enlarged view of a part of FIG. 1, viewed from a direction designated by an arrow A in FIG. 1A, and, FIG. 4 is a sectional view taken along the line IV—IV in FIG. 3.

Preferably, the flanged projections 11A and 11B are also provided with stiffening buttresses 14A and 14B, respectively, on either side of each clip 1, as shown in FIGS. 3 and 4. These stiffening buttresses not only prevent the clip from accidentally sliding circumferentially and becoming disengaged from the projections (if the flanged projections are discontinuous around the peripheries of the cover halves), but also reinforce the flanged projections 11A and 11B when the latter are pressed toward each other by the clip 1.

As can be understood from the above discussion, according to the present invention, the two cover halves can be easily connected to and disconnected from one another by means of simple clips.

I claim:

1. A plastic enclosure comprising a pair of convex cover halves, each having a periphery matable with the periphery of the other and at least one flanged projection adjacent to said periphery, each flanged projection on one of the cover halves being opposite a corresponding flanged projection on the other of the cover halves when the peripheries of the cover halves are mated together, and at least one fixture which holds the corresponding opposite flanged projections of the two cover halves when the two cover halves are mated to each other, said fixture comprising:

an elastic clip formed from a single strip of resilient material, the strip of resilient material having a center portion and two free ends which press the corresponding opposite flanged projections toward each other, the free ends being bent to extend transversely to the center portion, the bends of the free ends forming outer corners of the clip, and the center portion having a reverse bend forming a center recess having a bight extending in the same direction as the free ends such that the bight of the reverse bend is spaced inwardly from a line joining the outer corners of the clip, thereby enabling the clip to be easily opened and elastically deformed for attachment to and detachment from the flanged projections, said bight being accomodated by the opposing flanged projections forming a gap therebetween inwardly of the outer boundaries of said flanged projections and outwardly from where the peripheries of the halves mate together.

2. A plastic enclosure according to claim 1, wherein said elastic clip is symmetrical in shape with respect to the center recess.

3. A plastic enclosure according to claim 1, further comprising a seal member located between the two cover halves along the entire mating peripheries thereof.

4. A plastic enclosure according to claim 3, wherein one of said two cover halves is provided, on said at least one flanged projection, with a peripheral spacer abutment which extends from said projection into contact with the corresponding flanged projection of the other cover half to define a space between the mating peripheries of the two cover halves for accommodating said seal member.

5. A plastic enclosure accord-to claim 1, 2, 3, or 4, further comprising means on the flanged projections for preventing the clip from accidentally coming off the flanged projections.

6. A plastic enclosure according to claim 5, wherein said means comprises small projections provided on the outer edges of the flanged projections.

7. A plastic enclosure comprising a pair of convex cover halves, each having a periphery matable with the periphery of the other and at least one flanged projection adjacent to said periphery, each flanged projection on one of the cover halves being opposite a corresponding flanged projection on the other of the cover halves when the peripheries of the cover halves are mated together, and at least one fixture which holds the corresponding opposite flanged projections of the two cover halves when the two cover halves are mated to each other, said fixture comprising:

an elastic clip formed from a single strip of resilient material, the strip of resilient material having a center portion and two free ends which press the corresponding opposite flanged projections toward each other, the free ends being bent to extend transversely to the center portion, the bends of the free ends forming outer corners of the clip, and the center portion having a reverse bend forming a center recess having a bight extending in the same direction as the free ends such that the bight of the reverse bend is spaced inwardly from a line joining the outer corners of the clip, thereby enabling the clip to be easily opened and elastically deformed for attachment to and detachment from the flanged projections;

a compressible seal member located between the entire mating peripheries thereof, said seal member being compressed by the two free ends of each clip pressing the corresponding opposite flanged projections toward each other, and a peripheral spacer abutment extending from the flanged projection of one of the cover halves into contact with the corresponding flanged projection on the other cover half for limiting the deformation of said seal member; and a pair of stiffening buttresses formed integrally on each cover half adjacent each clip, one buttress on either side of the clip, the buttresses extending between the corresponding flanged projection and an adjacent outer wall surface of the respective cover half for strengthening the flanged projection to withstand the bending stress imposed by the clip pressing the flanged projections toward each other.

* * * * *

UNITED STATES PATENT AND TRADEMARK OFFICE
CERTIFICATE OF CORRECTION

PATENT NO. : 4,556,150
DATED : 3 December 1985
INVENTOR(S) : Yasumasa IKUMI

It is certified that error appears in the above-identified patent and that said Letters Patent is hereby corrected as shown below:

Column 2, line 26: after "means" insert --of--.

Column 2, line 55: after "off" delete "from".

Column 3, line 36: change "accomodated" to --accommodated--.

Column 4, line 3 : change "accord-to" to --according to--.

Signed and Sealed this

Twenty-seventh Day of May 1986

[SEAL]

Attest:

DONALD J. QUIGG

Attesting Officer

Commissioner of Patents and Trademarks